US012774391B2

(12) United States Patent
Fukuyama et al.

(10) Patent No.: US 12,774,391 B2
(45) Date of Patent: Oct. 27, 2026

(54) PVDF POWDER FOR REDUCED DISPERSION VISCOSITY COATINGS

(71) Applicant: Arkema Inc., King of Prussia, PA (US)

(72) Inventors: Takehiro Fukuyama, King of Prussia, PA (US); Diane M. Vaessen, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 669 days.

(21) Appl. No.: 18/267,808

(22) PCT Filed: Dec. 16, 2021

(86) PCT No.: PCT/US2021/063769
§ 371 (c)(1),
(2) Date: Jun. 16, 2023

(87) PCT Pub. No.: WO2022/140149
PCT Pub. Date: Jun. 30, 2022

(65) Prior Publication Data

US 2024/0059905 A1 Feb. 22, 2024

Related U.S. Application Data

(60) Provisional application No. 63/129,755, filed on Dec. 23, 2020.

(51) Int. Cl.
*C09D 5/03* (2006.01)
*C09D 127/20* (2006.01)
*C09D 133/08* (2006.01)

(52) U.S. Cl.
CPC ............. *C09D 5/037* (2013.01); *C09D 5/035* (2013.01); *C09D 127/20* (2013.01); *C09D 133/08* (2013.01)

(58) Field of Classification Search
CPC ................ C09D 127/16; C09D 133/02; C09D 133/08; C09D 133/10; C09D 133/12; C08L 27/16; C08L 33/02; C08L 33/08; C08L 33/10; C08L 33/12; C08L 2205/025; C08L 2205/03
See application file for complete search history.

(56) References Cited

U.S. PATENT DOCUMENTS

| | | | |
|---|---|---|---|
| 6,017,639 | A | 1/2000 | Higginbotham et al. |
| 6,362,271 | B1 | 3/2002 | Lin et al. |
| 6,699,933 | B2 | 3/2004 | Nguyen et al. |
| 9,029,453 | B2 | 5/2015 | Hidaka et al. |
| 9,640,690 | B2 | 5/2017 | Kwon et al. |
| 2011/0118403 | A1 | 5/2011 | Wood et al. |
| 2012/0073632 | A1 | 3/2012 | Kosar et al. |
| 2013/0122309 | A1 | 5/2013 | Zheng et al. |

FOREIGN PATENT DOCUMENTS

| | | | | |
|---|---|---|---|---|
| EP | 456018 | A1 | * | 11/1991 |
| EP | 572764 | A2 | * | 12/1993 |
| EP | 960918 | A2 | * | 12/1999 |
| WO | WO0100739 | A1 | | 1/2001 |
| WO | WO2019169217 | A2 | | 9/2019 |

OTHER PUBLICATIONS

Office Action (with English translation) issued by the Ministry of Intellectual Property, issued on May 27, 2026 in related Korean Application No. 10-2023-7024261, 15 pages.
Office Action (with English translation) issued by the Japanese Patent Office, issued on Jul. 30, 2026 in related Japanese Application No. 2023535520, 4 pages.

* cited by examiner

*Primary Examiner* — Jeffrey S Lenihan
(74) *Attorney, Agent, or Firm* — Joanne Rossi

(57) ABSTRACT

A method of reducing dispersion viscosity in a dispersion coating formulation is disclosed. The method comprises substituting a portion of the conventional PVDF in the formulation with a highly crystalline PVDF. The highly crystalline PVDF has a crystallinity 44% or greater (from X-ray diffraction). The highly crystalline PVDF imparts lower viscosity to the coating dispersion formulation.

16 Claims, No Drawings

PVDF POWDER FOR REDUCED DISPERSION VISCOSITY COATINGS

This application is a national stage application under 35 U.S.C. § 371 of PCT Application PCT/US2021/063769, filed Dec. 16, 2021; which claims benefit to United States Provisional Application 63/129,755; filed Dec. 23, 2020; said applications incorporated herein by reference.

FIELD OF THE INVENTION

The invention relates to a method of making a dispersion coating formulation having low viscosity and a polyvinylidene fluoride (PVDF) dispersion having low viscosity.

BACKGROUND OF THE INVENTION

Solvent-borne paints with high dispersion viscosity lead to problems for coating application (on a high-speed coil coating line or sprayed onto metal parts) and handling (e.g., pumping paint through a production facility and into containers).

US 20130122309 requires the use of dispersants or other additives to reduce dispersion viscosity, which can negatively affect other properties such as color. The current invention can reduce dispersion viscosity without adverse effects.

There are other patents involving the use of dispersants (U.S. Pat. No. 6,017,639) or crosslinkable acrylics (WO 2001/000739) to reduce viscosity.

Solvay patent U.S. Pat. No. 6,362,271 B1 mentions high crystallinity. It does not mention improved dispersion viscosity.

U.S. Pat. No. 6,699,933 (PPG) uses an aminoalkyl (meth) acrylate containing acrylic polymer that can be used in PVDF dispersion formulations to reduce viscosity without using dispersants.

Surprisingly it has been found that the incorporation of highly crystalline PVDF characterized in that said highly crystalline PVDF has a high crystallinity, high melting point, high enthalpy, and/or faster crystallization, into solvent-borne dispersion coatings leads to a reduction of dispersion viscosity across a range of different formulations.

BRIEF SUMMARY OF INVENTION

The invention relates to a method of reducing the viscosity on a dispersion coating formulation, the method comprising adding/substituting a highly crystalline polyvinylidene fluoride for a portion of the conventional PVDF to reduce the dispersion viscosity of a dispersion coating formulation containing organic solvents. Also provided it a dispersion coating formulation having a highly crystalline polyvinylidene fluoride in an amount of at least 10% of the total PVDF in dispersion coating formulation. The presence of the highly crystalline polyvinylidene fluoride provides for reduced viscosity as compared to the same formulation without the highly crystalline polyvinylidene fluoride. A pigmented version of the dispersion coating is also disclosed. The dispersion is useful for producing tough, chemical-resistant coatings, especially on metallic substrates, including for use as a coil coating or an architectural coating.

The amount of highly crystalline PVDF in the dispersion coating formulation is equal to or greater than 10 wt % of total PVDF and preferably is equal to or greater than 25 wt % of total PVDF in the dispersion coating formulation. Preferably, the highly crystalline PVDF in the dispersion coating formulation is from 10 wt % to 90 wt %, preferably 25 wt % to 75 wt % of total PVDF. The highly crystalline PVDF in the dispersion coating formulation can be from 33 wt % to 90 wt %, or from 45 wt % to 90 wt % of total PVDF.

Following the method of the invention substituting a highly crystalline PVDF for a portion of conventional PVDF in a dispersion coating formulation provides for a reduction in viscosity of the dispersion coating formulation of at least 10%, preferably at least 20% as compared to the same formulation without the PVDF substitution as measure by rotational viscometer at 10 sec-1.

Aspects of the Invention

Aspect 1: A method of reducing dispersion viscosity in a dispersion coating formulation comprising introducing a portion of highly crystalline PVDF as part of a dispersion coating formulation wherein the dispersion coating formulation comprises at least one conventional PVDF, at least one acrylic thermoplastic resin, organic solvent and optionally pigment, to form a coating formulation, wherein the highly crystalline PVDF has a crystallinity 44% or greater (from X-ray diffraction), and wherein the highly crystalline PVDF has a peak height on first cool of DSC of greater than 1.4 W/g, and a peak width at half-height on first cool of DSC of less than 4.8 degrees C. wherein the portion of highly crystalline PVDF is at least 10 wt %, preferably at least 25% by weight of the total PVDF in the dispersion coating formulation.

Aspect 2: The method of aspect 1, wherein the reduced viscosity is at least 10% less as compared to the same formulation using conventional PVDF in place of the highly crystalline PVDF and having no highly crystalline PVDF.

Aspect 3: The method of aspect 1 or 2, wherein the solvent does not contain isophorone.

Aspect 4: The method of any one of aspects 1 to 3, wherein the crystallinity of the highly crystalline PVDF is between 44%-55%, preferably 44.1 to 54%.

Aspect 5: The method of any one of aspects 1 to 4, wherein the highly crystalline PVDF has a peak height on first cool of DSC of from in W/g of between greater than 1.4 to 2.5, and more preferably between 1.4-2.0.

Aspect 6: The method of any one of aspects 1 to 5, wherein the highly crystalline PVDF has a peak width at half-height on first cool of DSC of between 2.0-4.7 degrees C., more preferably between 3.0-4.0 degrees C.

Aspect 7: The method of any one of aspects 1 to 6, wherein the highly crystalline PVDF has a melting point of greater than 162° C., 163° C. or greater, preferably 165° C. or greater.

Aspect 8: The method of any one of aspects 1 to 7, wherein the melt viscosity of the highly crystalline PVDF is from 5-50 kpoise at 100 sec-1 and 232 C.

Aspect 9: The method of any one of aspects 1 to 8, wherein the ratio of highly crystalline PVDF to conventional PVDF is from 10:90 to 90:10, preferably 25:75 to 75:25.

Aspect 10: The method of any one of aspects 1 to 8, wherein the ratio of highly crystalline PVDF to conventional PVDF is from 35:65 to 90:10, preferably 45:55 to 90:10.

Aspect 11: The method of any one of aspects 1 to 10, wherein said highly crystalline PVDF comprises hexafluoropropylene monomer units.

Aspect 12: The method of any one of aspects 1 to 11, wherein the ratio of total PVDF in the dispersion coating formulation to acrylic thermoplastic resin is between 90:10 to 30:70.

Aspect 13: The method of any one of aspects 1 to 12, wherein said acrylic thermoplastic resin comprises at least about 65 weight percent methyl methacrylate monomer units and up to about 35 weight percent comprises ethyl methacrylate or butyl methacrylate or ethyl acrylate monomer units or combinations thereof.

Aspect 14: The method of any one of aspects 1 to 13, wherein said pigment comprises titanium dioxide.

Aspect 15: The method of any one of aspects 1 to 13, wherein said pigment comprises at least one of metal oxides, alumina flake pigment, pearlescent mica pigment and combinations thereof.

Aspect 16: A dispersion coating formulation comprising of a highly crystalline PVDF wherein at least 10% of the total PVDF in the coating is highly crystalline and wherein the dispersion coating formulation comprises at least one conventional PVDF, at least one acrylic thermoplastic resin, organic solvents and optionally pigment, wherein the highly crystalline PVDF has a crystallinity 44% or greater (from X-ray diffraction), and wherein the highly crystalline PVDF has a peak height on first cool of DSC of greater than 1.4 W/g, and a peak width at half-height on first cool of DSC of less than 4.8 degrees C.

DETAILED DESCRIPTION OF THE INVENTION

All percentages used herein are weight percentages unless stated otherwise, and all molecular weights are weight average molecular weights unless stated otherwise. All references cited are incorporated herein by reference. Melt viscosity (MV) is measured at 232° C. at 100 sec-1 according to ASTM D3835.

Highly crystalline means a degree of crystallinity 44% or greater measured by X-ray diffraction. The terms resin and (co)polymer can be used interchangeable. "PVDF" means polyvinylidene fluoride.

Dispersion

The dispersion coating formulation comprises a blend of a highly crystalline PVDF, Conventional PVDF and a compatible polymer, such as, but not limited to, an acrylic thermoplastic resin, such as polymethyl methacrylate (PMMA) homopolymer or copolymers of MMA with $C_{1-4}$ acrylic monomers, where the total PVDF (highly crystalline and the conventional) makes up greater than 50 weight percent of total polymer in the formulation. A preferred embodiment is a blend of 70-98 weight percent of PVDF and 2-30 weight percent of polymethyl methacrylate or a polymethylmethacrylate copolymer based on total weight of PVDF and acrylic thermoplastic resin. The PMMA copolymer contains more than 50 weight percent of methyl methacrylate monomer units. The acrylic thermoplastic resin can be added to the PVDF polymer at any point during the formation of the final dispersion coating formulation, and may be first blended with other components that are further blended with the PVDF. In one embodiment, a liquid premix containing the acrylic thermoplastic resin in organic solvent(s) is first formed, and optional dispersing agents and the PVDF then added to the liquid premix. The dispersion coating formulation of the present invention also contains solvent and may optionally contain, optional dispersant and optional pigment. This dispersion coating formulation dispersion is used to create a coating on a substrate.

The PVDF is dispersed in an organic solvent which may optionally include a low level of one or more dispersants, and optional additives to form the dispersion coating formulation. The PVDF is present in the dispersion coating formulation at from 15 to 50 weight percent, preferably from 17 to 45 weight percent based on the total dispersion weight. The level of optional dispersant used is from 0 to 5%, based on the weight of PVDF, and preferably from 0.1 to 3% by weight.

The highly crystalline PVDF used to reduce the viscosity of the dispersion coating formulation in the present invention is characterized by a degree of crystallinity 44% or greater than (by X-ray diffraction), preferably between 44 to 55%. Preferably, the melt viscosity is between 5 and 50 Kpoise. Enthalpy, and/or faster crystallization is shown by dynamic scanning calorimetry (DSC) testing (on first cooling). The highly crystalline PVDF useful to reduce viscosity has a Peak Height in W/g to be equal to or greater than 1.4, preferably between 1.4-2.5, and more preferably between 1.4-2.0; and Peak Width half-height of less than 4.8 degrees C., preferably less than 4.7, more preferably less than 4.4. The Peak Width half-height can be between 2.0-4.7 degrees C., more preferably between 2.5-4.4 degrees C., more preferably between 3.0-4.0 degrees C. Generally, the melting point is greater than or equal to 164 C, preferably greater than or equal to 165 C.

The powder particle size of the all the PVDF in the formulation is D10 less than 4 microns, preferably less than 2.5 microns, more preferably less than 2 microns to have good gloss and D99 of less than 100 microns, preferably less than 50 microns, more preferably less than 25 microns. in order to obtain good gloss and prevent defects as a result of too large a particle size in the coating.

The addition of the highly crystalline PVDF allows for the viscosity of the dispersion coating formulation to be reduced while maintaining the total percentage of PVDF in the dispersion coating formulation. By reducing dispersion viscosity, higher solids formulations are possible, meaning less solvent waste/shipment.

The conventional PVDF in the dispersion coating formulation has a crystallinity of less than 44%. Generally, the Peak Height of the conventional PVDF is less than 1.4 W/g, preferably less than 1.35; and Peak Width half-height of 4.8 degrees C. or greater. In some embodiments the melting point will be less than or equal to 163 C.

This reduced viscosity result is surprising as both the conventional PVDF and the highly crystalline PVDF have very similar particle size distributions (i.e., each PVDF dispersed independently into a solvent should lead to the same distribution of particles, and therefore the same viscosity). Two powders with similar particle size distribution and similar composition would be expected to have similar viscosity but surprising in this invention they do not.

A lower dispersion viscosity in the dispersion coating formulation (DCF) has the added benefit of allowing for higher solids in the formulation, which means less shipping costs and less solvent waste. There will also be less visible marks coming from application equipment remaining on the baked coating allowing extremely smooth coating surfaces.

Highly Crystalline Polyvinylidene Fluoride

An especially preferred highly crystalline PVDF is a homopolymer of vinylidene fluoride. Copolymers of vinylidene fluoride can also be used as the viscosity modifying highly crystalline PVDF.

The highly crystalline PVDF may be a homopolymer, a copolymer, a terpolymer or a blend of a PVDF homopolymer or copolymer with one or more other polymers that are compatible with the PVDF. PVDF copolymers and terpolymers of the invention are those in which vinylidene fluoride units comprise greater than 70 percent of the total weight of all the monomer units in the polymer, and more preferably, comprise greater than 90 percent of the total weight of the units.

Copolymers, terpolymers and higher polymers of vinylidene fluoride may be made by reacting vinylidene fluoride with one or more monomers from the group consisting of vinyl fluoride, trifluoroethylene (VF3); tetrafluoroethylene (TFE); one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropylene (HFP); the partly fluorinated olefin hexafluoroisobutylene; perfluorinated (alkyl) vinyl ethers, such as perfluoromethyl vinyl ether (PMVE), perfluoroethyl vinyl ether (PEVE), and perfluoro propyl vinyl ether (PPVE); and perfluoro-2-propoxypropyl vinyl ether, fluorinated dioxoles, such as perfluoro(1,3-dioxole) and perfluoro (2,2-dimethyl-1,3-dioxole), allylic, partly fluorinated allylic, or fluorinated allylic monomers, such as 2-hydroxyethyl allyl ether or 3-allyloxypropanediol, and ethene or propene.

The PVDF could also be grafted with a reactive monomer such as maleic anhydride, which can bond to surfaces and improve adhesion. These functionalized resins are described in U.S. Pat. No. 7,241,817, incorporated herein by reference.

The PVDF polymers are conveniently made by an emulsion polymerization process, but suspension and solution processes may also be used. In an emulsion polymerization process, a reactor is charged with de-ionized water, and a non-fluorinated water soluble surfactant capable of emulsifying the reactants and polymer during polymerization, and the reactor and its contents are deoxygenated while stirring. The reactor and contents are heated to the desired temperature and vinylidene fluoride, and, optionally, chain transfer agents to control copolymer molecular weight are added at the selected amount and ratio. When the desired reaction pressure is reached, an initiator is added to start and maintain the reaction.

The reactor used in the polymerization is a pressurized polymerization reactor, equipped with a stirrer and heat control means. The temperature of the polymerization can vary depending on the characteristics of the initiator used, but it is typically between 50° C. and 135° C., and most conveniently it is between 70° C. and 120° C. The temperature is not limited to this range, however, and might be higher or lower if a high-temperature or low-temperature initiator is used. The pressure of the polymerization is typically between 1380 and 8275 kPa, but it can be higher if the equipment permits operation at higher pressure. The pressure is most conveniently between 3450 and 5520 kPa.

The polyvinylidene fluoride latex from the polymerization has a solids level of from 15 to 70 weight percent, preferably from 20 to 65 weight percent. The polymer particles in the polymerization latex dispersion have a primary particle size in the range of 50 to 900 nm, and preferably from 100-500 nm. When dried the primary particles coagulate to form larger powder particles.

To obtain dry PVDF, the latex is coagulated by conventional methods the coagulum is separated and the separated coagulum may be washed. To provide powder, the coagulum is dried by means known in the art, such as by spray drying or freeze drying.

Acrylic Thermoplastic Resin

The dispersion coating formulation contains a blend of a PVDF with a compatible polymer, such as, but not limited to, an acrylic thermoplastic resin where the PVDF makes up greater than 50 weight percent of the blend. In a preferred embodiment, the blend is 70-98 weight percent of PVDF and 2-30 weight percent of polymethyl methacrylate or a polymethylmethacrylate copolymer. Examples of the compatible acrylic thermoplastic resin include, but are not limited to, polymethyl methacrylate (PMMA) homopolymers or copolymers of methyl methacrylate (MMA) with alkyl-acrylic monomers, preferably C1 to C4, for example such as ethyl acrylate, ethyl methacrylate and butyl methacrylate. The acrylic thermoplastic resin contains more than 50 weight percent of methyl methacrylate monomer units. The acrylic thermoplastic resin can be blended with the PVDF at a point during the formation of the final coating dispersion, and may be first blended with other components that are further blended with the PVDF. In one embodiment, a liquid premix containing the acrylic thermoplastic resin in organic solvent(s) is first formed, and optional dispersing agents and the PVDF then added to the liquid premix. Acrylics useful in the present invention preferably have a weight average Mw in the range of 50,000-300,000 g/mol relative to a PMMA standard using GPC.

The acrylic thermoplastic resin may comprise at least about 65 weight percent methyl methacrylate monomer units and up to about 35 weight percent of ethyl methacrylate or butyl methacrylate or ethyl acrylate monomer units or combinations thereof.

Dispersant

Dispersants known in the art can be used as dispersants in the present invention.

Solvent

The PVDF, and optional dispersant are dispersed in an organic solvent, or a mixture of organic solvents. The organic solvent typically acts as a solvent for the PVDF; that is, the PVDF is substantially insoluble and dispersed in the solvent at room temperature but becomes solvated or dissolved in the solvent when the dispersion coating formulation is heated. The solvent generally makes up 20 to 75 weight percent and, preferably, about 30 to about 70 weight percent of the coating dispersion. Preferably, the solvent component of the dispersion coating formulation preferably does not include isophorone.

In some instances, it may be preferable to choose a solvent that will not be totally volatilized under the baking conditions used and the residual solvent remaining in the film can act as a plasticizer. For other applications, it may be preferable to choose a solvent that will be essentially completely volatilized under the baking conditions employed. Preferably, the solvent has a boiling point of from 170° C. to 400° C.

Solvents useful in the invention include, but are not limited to, glycerol esters, glycol esters, esters (e.g., butyrates) of other aliphatic polyols, phthalates, adipates, benzoates, azelates, carbonates, trimellitates, phosphates, citrates, stearates, sebacates, glutarates, oleates, alkyds, polymeric esters, epoxidized oils, epoxy tallates, amide-esters, sulfonamides, terpenes, aromatics and ketones, esters of aliphatic dibasic acids and di- or triesters of aliphatic polyols and monoesters of alkyleneoxy ethers. Preferably the solvent includes a diester of a branched aliphatic diol, and more preferably, a butyrate diester of a branched octanediol, such as 2,2,4-trimethyl-1,3-pentanediol diisobutyrate ("TXIB").

Other preferred solvents for use in the present invention include polyol diesters, such as triethylene glycol bis(2-ethylhexanoate) (TEG-EH), and esterfied ethers, e.g., esters of glycol monoethers such as propyleneglycol methyl ether acetate (PMAacetate) or dipropyleneglycol methyl ester acetate (DPMA).

Other useful solvents which may be present to some extent as part of the solvent portion of the present dispersion coating formulation include phthalates such as butyl benzyl phthalate and dialkyl phthalates (e.g., di(2-ethylhexyl) phthalate, dimethyl phthalate and dioctyl phthalate); aromatics such as toluene and xylenes; ketones such as isophorone; aliphatic dibasic acid esters such as dioctyl azelate, diisodecyl adipate and di(2-ethylhexyl) sebacate; phosphates such as trioctyl phosphate and 2-ethylhexyl diphenyl phosphate; epoxy plasticizers such as epoxidized soybean oil, epoxidized tall oil fatty acid 2-ethylhexyl esters, and other conventional polyester solvents commonly employed as plasticizers.

Preferably, at least about 60 weight percent of the solvent portion of pigmented versions of the present dispersion coating formulation consists of one or more non-aromatic esters. The solvent fraction may include a minor amount (i.e., no more than about 30 weight %) of a non-aromatic ketone and/or a hydroxy functional solvent such as a glycol monoether (e.g., butyl carbitol) or a half ester of an aliphatic diol (e.g., 2,2,4-trimethyl-1,3-pentanediol monoisobutyrate). More preferably, at least about 90 weight % and, most preferably, substantially the entire solvent portion consists of one or more non-aromatic esters. In one embodiment at least 95 weight percent of the solvent portion is 2,2,4-trimethyl-1,3-pentanediol diisobutyrate (TXIB). Other preferred dispersion coating formulations include a solvent component consisting essentially of one or more of TXIB, butyl carbitol acetate, PM acetate, DPM acetate or mixtures thereof.

In designing a particular formulation, the solvent system and optional dispersant are typically chosen to complement each other. For example, amine-based dispersants are particularly effective where the main solvent is an ester or mixture of esters. When the dispersion coating formulation is based on a ketone solvent, fluorinated anionic surfactants can be particularly effective.

Other Additives

One or more other additives may also be added to form a final dispersion coating formulation. Such additives are known in the coating art, and include a flatting agent to reduce gloss, an additive to improve mar resistance, surfactants, antioxidants, ultraviolet light absorbers and stabilizers, rheology control agents, coalescing agents and the like.

The present dispersion coating formulation may be a clear (unpigmented), such as when applied as a protective top coat layer. The dispersion coating formulation is often pigmented to provide opacity, and color. Typical, pigmented versions of the present dispersion coating formulation include about 5 to about 50 and preferably about 20 to about 40 wt % of one or more pigments of total solids in dispersion. Useful pigments include pigments generally used in the coating industry.

Some example pigments include but are not limited to metal oxides, alumina flake pigment, pearlescent mica pigment and combinations thereof. Titanium dioxide is a common pigment.

Preparation and Application

The dispersion coating formulation of the present invention may be prepared by conventional methods. For example, the dispersion coating formulation may be prepared by blending the various components using a high speed disperser and milling equipment, such as a small media mill.

In general the ratio of total PVDF in the dispersion coating formulation to acrylic thermoplastic resin is between 90:10 to 30:70 by weight.

The dispersion coatings of the invention may be applied to a substrate by means known in the art, including but not limited to brushing, bar coating, roll coating, inkjet application and spraying. The coating may be applied to one, or more sides of the substrate. The substrate is generally metallic, including but not limited to aluminum, hot dipped galvanized steel, and zinc-aluminum alloys on steel. Two or more coats of the dispersion coating may be added, and the metal may be physically or chemically primed prior to coating. Following application of the PVDF dispersion coating the substrate is heated to cure the coating and form a tough film.

Where large rolls of thin gauge metal are to be coated, it is advantageous to apply the dispersion coating formulation via a coil coating process, such as reverse roll coating. When the coating is carried out using such a process, the coated metal substrate is typically cured by heating for about 10 to about 50 seconds at a temperature of about 200° C. to 300° C. If a spray coating process is used the resulting film is usually cured by heating for about 10 to about 15 minutes at a temperature of about 210° C. to about 270° C. The baking temperatures are not critical, but must be high enough to cause the PVDF polymer particles in the dispersion to coalesce into a continuous film.

The dispersion coating formulation of the invention is generally used at a total solids content of between 25 to 80 weight percent, preferably 30 to 70 weight percent. If desired, however, the dispersion coating formulation may be thinned prior to being applied by the addition of a solvent. For spray applications additional solvent, such as xylene, toluene, methyl ethyl ketone or 2-butoxy ethanol, or the like, may be added to reduce the resin solids content of the dispersion coating formulation. The useful viscosity of the dispersion varies depending upon the spray equipment and atmospheric conditions. When applied via spray methods, pigmented versions of the present dispersion coating formulation can have a total solids content of about 50 to about 70 weight percent (total resin solids of about 35 to about 50 weight percent). Clear versions of the present dispersion coating formulation can contain a total resin solids content of about 30 to about 45 wt %.

Typical stormer viscosity of the dispersion coating formulation is usually in the range 50 to 100 KU. Measured using ASTM D562.

The invention provides for a reduced dispersion coating formulation viscosity compared to PVDF dispersions in organic solvents without the presence of the highly crystalline PVDF. This can bring advantages in increasing the PVDF resin solid content and thus reduce the dispersion VOC level.

EXAMPLES

Raw Materials:

PARALOID B44S: Methyl methacrylate-ethyl acrylate copolymer, available from Dow Chemicals. MW is about 140,000

TI-PURE R960 $TiO_2$, available from DuPont

PVDF 1 is a conventional PVDF used in coatings with a Melt viscosity in the range of 29-33 kPoise. Different lots were used in Ex 1, Ex2 and Ex3 resulting in slightly different particles size distributions.

PVDF 2 is a highly crystalline PVDF with a Melt viscosity in the range of 17.5 kPoise to 22.5 kPoise. Different lots were used in Ex 1 and Ex2 resulting in slightly different particles size distributions PVDF 3 is a highly crystalline PVDF with a Melt viscosity in the range of 5 to 8 kPoise. Different lots were used in Ex 1 and Ex3 resulting in slightly different particles size distributions

PVDF:

| PVDF | % Crystallinity | Melting Point (° C.) | Delta H (J/g) | Peak Height (W/g) | Peak Width at Half-Height (° C.) |
|---|---|---|---|---|---|
| PVDF 1 (Conventional) | 43.9 | 162.0 | 52.9 | 1.3 | 4.8 |
| PVDF 2 | 44.3 | 165.5 | 54.9 | 1.9 | 3.7 |
| PVDF 3 | 48.1 | 166.2 | 61.5 | 1.9 | 3.4 |

Degree of crystallinity (% Crystallinity): X-ray diffraction experiments were conducted on the Rigaku SmartLab diffraction platform (Cu Kα 1.5418 Å, 40 kV, 40 mA). WAXS data acouisition: 1D reflection mode. IS=1 mm. Length slit=10 mm. RS1=RS2=3 mm. range: 5.0-80.0° 2θ, 0.03° step, 0.5°/min.

The DSC runs were cycled 10° C./min from −20° C. to 210° C. using ASTM E793-06. Melting point and Delta H are based on second heat, while peak height and peak width at half-height are based on first cool DSC.

Example 1

PVDF:

| PVDF | D10 (um) | D50 (um) | D90 (um) | D95 (um) |
|---|---|---|---|---|
| PVDF 1 (Conventional) | 2.12 | 4.23 | 8.73 | 11.96 |
| PVDF 2 | 2.13 | 4.20 | 7.90 | 9.78 |

*Particle size was measured on a Microtrac instrument. The data is reported as volume-average particle size (diameter)

Procedure for Making Formulation:

Step. 1: In a glass container with a screw lid, 40 g of Paraloid B44S and 160 g of toluene were weighed. The container was sealed and mixed at 50 deg. C., 100 rpm on a mix rotor to obtain 200 g of 40 wt % Paraloid B44S solution.

Paraloid B44S is a MMA/EA thermoplastic copolymer from Dow chemical company

Step. 2: The pigment grind was prepared according to the recipe below.

| Pigment grind | g |
|---|---|
| Paraloid B44S 40% in toluene | 66.98 |
| TiO2 | 77.52 |
| Butyl Diglycol | 103.4 |
| Total | 247.9 |

In a metal cup, Paraloid B44S solution and butyl diglycol were weighed. TiO2 was weighed in a separate container. The cup with the liquid was put in a homogenizer and secured. While mixing at 1500 rpm, TiO2 was slowly added into the cup, allowing the powder to wet by the liquid before adding more. After adding all TiO2, the mixture was stirred at 3600 rpm for 10 min. The powder on the cup sides were scraped off then the mixture was stirred again at 3600 rpm for another 10 min.

Step. 3: The premix was prepared according to the recipe below. A premix was made with PVDF 1 and a Premix was made with PVDF 2.

| Premix | g |
|---|---|
| Paraloid B44S 40% in toluene | 18 |
| Butyl Diglycol | 66.07 |
| 4-methyl-2-pentanone | 6 |
| PVDF Resin | 72 |
| Total | 162.37 |

In a metal cup, Paraloid B44S solution, butyl diglycol, and methyl isobutylketone were weighed. The appropriate amount of PVDF1 and PVDF2 in powder form were weighed to obtain the desired ratio each in a separate container. The cup with the liquid was put in a homogenizer and secured. While mixing at 800 rpm, PVDF1 was slowly added into the cup, allowing the powder to wet by the liquid before adding more. After adding all PVDF1, PVDF-2 was slowly added to the same cup by the same method as PVDF1. The mixture was stirred at 3600 rpm for 10 min. The viscosity of the premix was measured at 10 sec-1 rpm using a rotational viscometer.

PVDF in Example 1

| PVDF in Example 1 | 10 s−1 (cp) |
|---|---|
| 100% PVDF 1 (premix) | 684 |
| 75% PVDF 1/25% PVDF 2 (premix) | 438 |
| 50% PVDF 1/50% PVDF 2 (premix) | 368 |
| 25% PVDF 1/75% PVDF 2 (premix) | 339 |
| 100% PVDF 2 (premix) | 352 |

Rotational Viscometer Used:

Equipment: Anton paar MCR302 with P-PTD200+H-PTD200, PP50 Clamp.

Step 4: The final formulation was prepared according to the recipe below.

| Final Formulation | g |
|---|---|
| Premix | 27 |
| Pigment grind | 36 |

27 g of the premix from step 3 and 36 g of the pigment grind from step 2 were mixed in a container. For 100% PVDF1 and 100% PVDF2 formulations, the pigment grind was mixed on the same day which it was prepared whereas for 75% PVDF1/25% PVDF 2, 50% PVDF 1/50% PVDF 2, and 25% PVDF 1/75% PVDF 2 formulations, the pigment grind was aged for 10 days before mixing. The viscosity was measured at 10 sec-1 rpm using a rotational viscometer at room temperature (20 C).

| PVDF in Example 1 | 10 sec−1 (cp) |
|---|---|
| 100% PVDF 1 (final formulation) | 4186 |
| 75% PVDF 1/25% PVDF 2 (final formulation) | 2915 |
| 50% PVDF 1/50% PVDF 2 (final formulation) | 2851 |
| 25% PVDF 1/75% PVDF 2 (final formulation) | 2622 |
| 100% PVDF 2 (final formulation) | 2912 |

| PVDF | 60° Gloss |
|---|---|
| 100% PVDF 1 (final formulation) | 25.0 |
| 75% PVDF 1/25% PVDF 2 (final formulation) | 24.3 |
| 50% PVDF 1/50% PVDF 2 (final formulation) | 26.1 |
| 25% PVDF 1/75% PVDF 2 (final formulation) | 32.5 |
| 100% PVDF 2 (final formulation) | 33.8 |

60° Gloss was measured after baking the wet coatings at 230 C for 15 minutes, then air cooled. This shows the final properties (gloss) are nearly the same even though dispersion viscosity is different.

Example 2

PVDF:

| Powder PVDF | D10 (microns) | D50 (microns) | D90 (microns) | D99 (microns) |
|---|---|---|---|---|
| PVDF 1 (Conventional) | 1.2 | 3.67 | 7.59 | 13.67 |
| PVDF 3 | 2.44 | 7.67 | 18.66 | 81.65 |

*Particle size was measured on a Microtrac instrument. The data is reported as volume-average particle size (diameter).

Step 1: The following solvent blend was prepared and kept in a sealed glass jar:

| Material | Weight (g) |
|---|---|
| Dowanol DB | 252.5 |
| Paraloid B44S (40% in Toluene) | 123.1 |

solvent blend was then used for the grind mixture (in step 3)

Dowanol DB is Diethylene Glycol n-Butyl Ether available from Dow Chemical Company, Michigan Step 2: Using a high speed disperser, the PVDF grind was made according to the recipe below:

| Material | Weight (g) |
|---|---|
| Paraloid B44S (40% in Toluene) | 45 |
| Dowanol DB | 90 |
| Methyl isoamyl Ketone | 15 |
| Cyastat SN | 0.36 |
| PVDF | 180 |
| TOTAL | 330.36 |

In a small stainless steel pot, all liquids were weighed. PVDF was then weighed out into a separate beaker. The pot was put onto the mixer, secured, then mixed at 1000 rpm. The PVDF was slowly poured into pot, allowing the powder to wet out before adding more, and scraping down the sides after all has been added. The speed was slowly turned up to 3900 rpms and mixed for 10 minutes.

Step 3: White pigment grind/paint:

| Material | Weight (g) |
|---|---|
| PVDF grind from step 2 | 220 |
| Pre-made solvent blend from step 1 | 300.5 |
| TiO2 R960 | 114 |

100 grams of solvent blend (from step 1) was poured into a new pot, and the mixer was set to 1000 rpm while slowly adding the 114 g TiO2. After all the TiO2 has been added, the speed was turned up to 3900 rpms and mixed for 15 minutes. The sides of the pot were scraped down and 220 grams of PVDF grind from Step 2 was added, followed by 4 minutes of mixing at 3900 rpm. The last of the solvent blend from Step 1 was then added and mixed at 1000 rpm for 1 minute. The paint was then poured into a glass jar. The Brookfield viscosity was measured after the paints equilibrated overnight (20 C), while the Stormer viscosity was measured two days later. 60° Gloss was measured after baking the coatings at 585 F for 45 seconds and quenching in water.

| PVDF in Example | Brookfield Viscosity, cp (Spindle #5) | | Stormer | 60° |
|---|---|---|---|---|
| 2 Formulation | 10 rpms | 100 rpms | Viscosity, KU | gloss |
| PVDF 1 (Conventional) | 9760 | 1976 | 99.2 | 63.9 |
| 67% PVDF 1/33% PVDF 3 | 9720 | 1748 | 95 | 57.2 |
| 33% PVDF 1/67% PVDF 3 | 9160 | 1612 | 92.9 | 64.9 |
| PVDF 3 | 8000 | 1492 | 91.5 | 68 |

Comparative Example 3

PVDF Resins:

| PVDF Resin | D10 (um) | D50 (um) | D90 (um) | D99 (um) |
|---|---|---|---|---|
| PVDF 1 (Conventional) | 0.97 | 3.29 | 7.2 | 15.02 |
| PVDF 2 | 1.22 | 3.59 | 7.2 | 14.8 |

*Particle size was measured on a Microtrac instrument. The data is reported as volume-average particle size (diameter).

Formulation:

| Ingredient | Parts by Weight (g) |
|---|---|
| PVDF | 20.5 |
| Paraloid B44S (40% in Toluene) | 21.9 |
| TiO2 (Ti-Pure R960) | 15.8 |
| Isophorone | 41.8 |
| Total | 100 |

In stainless steel beaker, the Paraloid B44S was weighed, put aside, and covered with foil. In plastic beaker the isophorone was weighed, put aside, and covered with foil. $TiO_2$ and PVDF were weighed in two separate paper cups.

The stainless steel beaker containing the B44 was placed under the mixer, about ⅓ of isophorone was added, and the mixer was turned on to about 1000 rpms. The $TiO_2$ was then added, while adding small amounts of isophorone to ensure a smooth mixture. Once all the $TiO_2$ was added, the pot was covered and the mixer was turned up to 3900 rpm and allowed to mix for 20 minutes, stopping at 10 minutes of mixing to scrape down the sides. After the 20 minutes of mixing, more isophorone was added and the mixer was restarted (1000 rpm) while the PVDF was slowly added. More isophorone was added during the PVDF addition to ensure a smooth mixture. Once all the PVDF and isophorone were added, the pot was covered and allowed to blend 10 more minutes, stopping at 5 minutes to scrape the sides. Any leftover isophorone was then added during the last minute and blended at 1000 rpm. The paint was then poured into a glass jar. The Brookfield viscosity was measured after the paints equilibrated overnight, while the Stormer viscosity was measured about one week later.

| PVDF Resin in Example | Brookfield Viscosity, cp (Spindle #4) | | Stormer |
|---|---|---|---|
| 3 Formulation | 10 rpm | 100 rpm | Viscosity, KU |
| PVDF 1 (Conventional) | 4400 | 1460 | 96.1 |
| PVDF 2 | 4020 | 1352 | 94.3 |

Examples 1 and 2, non-isophorone formulations show the most benefit.

This shows there is little effect when isophorone is used as the solvent.

The invention claimed is:

1. A method of reducing dispersion viscosity in a dispersion coating formulation comprising introducing a portion of a first PVDF having a crystallinity of greater than 44% as part of a dispersion coating formulation wherein the dispersion coating formulation comprises at least one second PVDF having a crystallinity of less than 44%, at least one acrylic thermoplastic resin, organic solvent and optionally pigment, to form a coating formulation, wherein the first PVDF and the second PVDF comprise at least 70 wt % vinylidene fluoride monomer units, and wherein the first PVDF has a peak height on first cool of DSC of greater than 1.4 W/g, and a peak width at half-height on first cool of DSC of less than 4.8 degrees C., wherein the portion of the first PVDF is at least 10wt % of the total PVDF in the dispersion coating formulation.

2. The method of claim 1 wherein the reduced viscosity is at least 10% less as compared to the same formulation using the second PVDF in place of the first PVDF.

3. The method of claim 1 wherein the solvent does not contain isophorone.

4. The method of claim 1 wherein the crystallinity of the first PVDF is from greater than 44% to 55%.

5. The method of claim 1 wherein the first PVDF has a peak height on first cool of DSC of greater than 1.4 to 2.5 W/g.

6. The method of claim 1 wherein the first PVDF has a peak width at half-height on first cool of DSC of between 2.0-4.7 degrees C.

7. The method of claim 1 wherein the first PVDF has a melting point of greater than 162° C.

8. The method of claim 1 wherein the melt viscosity of first PVDF is from 5-50 kpoise at 100 sec-1 and 232° C.

9. The method of claim 1 wherein the weight ratio of the first PVDF to the second PVDF is from 10:90 to 90:10.

10. The method of claim 1 wherein the weight ratio of the first PVDF to the second PVDF is from 35:65 to 90:10.

11. The method of claim 1 wherein said first PVDF comprises hexafluoropropylene monomer units.

12. The method of claim 1 wherein the weight ratio of total PVDF in the dispersion coating formulation to acrylic thermoplastic resin is between 90:10 to 30:70.

13. The method of claim 1 wherein said acrylic thermoplastic resin comprises at least about 65 weight percent methyl methacrylate monomer units and up to about 35 weight percent of ethyl methacrylate or butyl methacrylate or ethyl acrylate monomer units or combinations thereof.

14. The method of claim 1 wherein said pigment comprises titanium dioxide.

15. The method of claim 1 wherein said pigment comprises at least one of metal oxides, alumina flake pigment, pearlescent mica pigment or combinations thereof.

16. A dispersion coating formulation comprising a first PVDF having a crystallinity of 44% or greater, at least one second PVDF having a crystallinity of less than 44%, at least one acrylic thermoplastic resin, organic solvent and optionally pigment, wherein the first PVDF and the second PVDF each comprise at least 70 wt % vinylidene fluoride monomer units, wherein at least 10% of the total PVDF in the coating is the first PVDF, and wherein the first PVDF has a peak height on first cool of DSC of greater than 1.4 W/g, and a peak width at half-height on first cool of DSC of less than 4.8 degrees C.

* * * * *